United States Patent
Sato

(10) Patent No.: US 7,753,426 B2
(45) Date of Patent: Jul. 13, 2010

(54) INTERIOR MEMBER FOR CAB OF WORK VEHICLE AND METHOD FOR FORMING SAME, AS WELL AS WALL MEMBER

(75) Inventor: Kan'ichi Sato, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 12/421,304

(22) Filed: Apr. 9, 2009

(65) Prior Publication Data

US 2009/0200826 A1     Aug. 13, 2009

Related U.S. Application Data

(63) Continuation of application No. 10/559,978, filed as application No. PCT/JP2004/008275 on Jun. 8, 2004, now Pat. No. 7,575,266.

(30) Foreign Application Priority Data

Jun. 11, 2003  (JP) ............................. 2003-166687

(51) Int. Cl.
B60R 13/08 (2006.01)
E04B 1/82 (2006.01)
B60J 5/04 (2006.01)

(52) U.S. Cl. .................. 296/39.3; 296/146.7

(58) Field of Classification Search ............... 52/309.1, 52/309.2, 309.3, 309.4, 309.5, 309.6, 309.7, 52/309.8, 309.9, 309.11, 309.12, 309.13, 52/309.14, 309.15, 309.16, 309.17; 181/290, 181/291, 293; 209/39.1, 39.3, 146.7, 190.01, 209/190.08, 190.09, 191, 208; 296/39.1, 296/39.3, 146.7, 190.01, 190.08, 190.09, 296/191, 208
See application file for complete search history.

(56) References Cited

U.S. PATENT DOCUMENTS

| 2,069,413 A | 2/1937 | Leadbetter |
| 2,198,885 A | 4/1940 | Price |
| 2,973,295 A | 2/1961 | Rodgers, Jr. |
| 3,829,150 A | 8/1974 | Moore |

(Continued)

FOREIGN PATENT DOCUMENTS

DE          140 663        3/1980

(Continued)

OTHER PUBLICATIONS

German Office Action dated Nov. 4, 2009 (3 pages), and English translation thereof (3 pages), issued in counterpart German Application Serial No. 11 2004 001 016.0.

*Primary Examiner*—Glenn Dayoan
*Assistant Examiner*—Paul A Chenevert
(74) *Attorney, Agent, or Firm*—Frishauf, Holtz, Goodman & Chick, P.C.

(57) ABSTRACT

An object is to enhance the sound absorbing functions of an interior member, and furthermore, to increase ease of assembly of the interior member, and the interior member for the cab is integrally formed so as to have a laminated structure where a sound absorbing material is contained between an outer layer material and a foundation body panel, or inside a foundation body panel. In addition, such an interior member is formed in accordance with a reaction injection molding method.

8 Claims, 14 Drawing Sheets

U.S. PATENT DOCUMENTS

| | | |
|---|---|---|
| 3,868,796 A | 3/1975 | Bush |
| 3,989,275 A * | 11/1976 | Finch et al. ............... 280/751 |
| 4,206,267 A | 6/1980 | Jungbluth |
| 4,308,308 A | 12/1981 | Sachse |
| 4,351,870 A | 9/1982 | English, Jr. |
| 4,546,899 A | 10/1985 | Williams |
| 4,825,974 A | 5/1989 | Hoffmann et al. |
| 4,971,850 A | 11/1990 | Kuan-Hong |
| 5,040,335 A | 8/1991 | Grimes |
| 5,111,619 A | 5/1992 | Billin et al. |
| 5,280,991 A | 1/1994 | Weiland |
| 5,345,720 A | 9/1994 | Illbruck et al. |
| 5,389,317 A | 2/1995 | Grimmer |
| 5,472,760 A | 12/1995 | Norvell |
| 5,595,415 A | 1/1997 | Beaulat |
| 5,626,382 A | 5/1997 | Johnson et al. |
| 5,744,763 A | 4/1998 | Iwasa et al. |
| RE37,139 E | 4/2001 | Krickl |
| 6,238,507 B1 | 5/2001 | Jones et al. |
| 6,409,947 B1 | 6/2002 | Wandyez |
| 6,447,047 B1 | 9/2002 | Marcovecchio et al. |
| 6,861,100 B1 | 3/2005 | Schucker |
| 7,284,784 B2 | 10/2007 | Cowelchuk et al. |
| 7,575,266 B2 | 8/2009 | Sato |
| 2003/0066708 A1 | 4/2003 | Allison et al. |
| 2004/0113455 A1 | 6/2004 | Schmidt |
| 2004/0212221 A1 | 10/2004 | Sato |
| 2006/0202499 A1 | 9/2006 | Blomeling |
| 2006/0216479 A1 | 9/2006 | Cowelchuk et al. |
| 2007/0278826 A1 | 12/2007 | Sato |

FOREIGN PATENT DOCUMENTS

| | | |
|---|---|---|
| DE | 32 15244 A1 | 10/1983 |
| DE | 35 02 056 A1 | 7/1986 |
| DE | 39 32 121 A1 | 4/1991 |
| DE | 199 58 374 A1 | 6/2000 |
| DE | 199 56 335 | 5/2001 |
| EP | 0 571 640 A1 | 12/1993 |
| JP | 52-62815 A | 5/1977 |
| JP | 52-151509 | 11/1977 |
| JP | 58-150545 | 10/1983 |
| JP | 58-183330 A | 10/1983 |
| JP | 59-120545 A | 7/1984 |
| JP | 60240543 A * | 11/1985 |
| JP | 60240571 A * | 11/1985 |
| JP | 61113535 A * | 5/1986 |
| JP | 63-188544 A | 8/1988 |
| JP | 64-52842 | 3/1989 |
| JP | 4-169346 A | 6/1992 |
| JP | 4-201750 A | 7/1992 |
| JP | 5-42824 A | 2/1993 |
| JP | 9-105150 A | 4/1997 |
| JP | 10095369 A * | 4/1998 |
| JP | 2000-319938 A | 11/2000 |
| JP | 2002-205528 A | 7/2002 |
| JP | 2003-032861 A | 1/2003 |

* cited by examiner

11(a)

11(b)

12(a)

12(b)

12(c)

INTERIOR MEMBER FOR CAB OF WORK VEHICLE AND METHOD FOR FORMING SAME, AS WELL AS WALL MEMBER

CROSS-REFERENCE TO RELATED APPLICATION

The present application is a Continuation Application of U.S. application Ser. No. 10/559,978 filed Dec. 8, 2005 now U.S. Pat. No. 7,575,266, which is incorporated herein by reference, which is a U.S. National Phase Application under 35 USC 371 of International Application PCT/JP2004/008275 filed Jun. 8, 2004.

TECHNICAL FIELD

The present invention relates to an interior member for the cab of work vehicles, including construction machines such as hydraulic shovels, agricultural machines such as tractors, and other industrial machines, a method for forming the same, as well as a wall member.

BACKGROUND ART

Work vehicles include a variety of types, such as construction machines, cargo handling machines, agricultural machines and the like. As for a cab 110 that is provided to such work vehicles, in the case of a hydraulic shovel 100 from among, for example, construction machines, as shown in FIG. 14, an upper structure 103 is installed so as to be freely rotatable via a rotary mechanism 102 on top of a lower traveling body 101, and a work machine 104 having a boom 105 that is provided so as to be able to move upward and downward, an arm 106 which is provided to the end of this boom 105 so as to be able to turn and move upward and downward, and an attachment 107, such as a bucket, that is provided to the end of this arm 106 so as to be able to move upward and downward; a power source, such as an engine 108; and cab 110 are mounted on the above described upper structure 103.

The above described cab 110 is generally formed so as to be in box form where a front window is provided on the front surface, a window that is as large as possible is provided on the rear, a window is also provided in the upper half of the side on which the above described work machine 104 is installed, and a door 111 is provided on the opposite side (left side of the vehicle) so that the operator can enter into or exit from cab 110 by opening and closing this door 111.

In cab 110 that is configured in this manner, electronic parts, such as switches that are required for operation, display apparatuses and air vents for an air conditioner (hereinafter referred to as air conditioning system) are provided, in order to increase working efficiency and make the working environment comfortable. These parts and apparatuses are placed along the wall portions so as to secure space and increase working efficiency. In addition, it is most desired for cab 110 of a work vehicle of this type, where operation is carried out while looking out through the front, to have a wide front view for operation through the front window. Therefore, cab 110 is designed in such a manner that the width of the front pillars that are located on both sides of the front in this structure is made as narrow as possible so as to reduce visual nuisances at the time of operation. Meanwhile, operation may be carried out in hydraulic shovel 110 in a state where the vehicle sits tilted on inclined ground, for example, when operation is carried out on a construction site having poor foothold, and in some cases, there is a risk that the vehicle may topple. Therefore, attempts are being made to toughen the structure of the frame of cab 110, so as to protect the operator inside cab 110, even in the case where the vehicle topples and the impact of toppling works on cab 110.

Meanwhile, improvement to the interior of the cab, in terms of creating a large space and enhancing comfort in order to increase workability and improve the working environment at the time of operation, as described above, and at the same time, making the space more comfortable by, for example, reducing noise, is a point that has been attracting attention. In Japanese Unexamined Patent Publication H9 (1997)-105150, a configuration where divided units are incorporated in a cosmetic cover, in such a manner that ducts for air conditioning are mounted in an interior portion, and electrical and mechanical functional parts are mounted so as to be located on side walls, and this cosmetic cover is made to make elastic contact with the sides of the cab is proposed.

In addition, Japanese Unexamined Patent Publication 2002-205528 discloses a technology for forming an installment panel that is installed within the cab of a vehicle such as a passenger car of the outer layer made of polyurethane foam and a foundation body panel made of hard polyurethane foam, so that a duct wall portion is integrally formed on the rear surface of the foundation body panel.

However, various types of functional parts are provided inside, making the shape on the surface of the structure different, depending on the portion, and therefore, the cosmetic cover for covering these parts on one inner side of the cab cannot be integrated in accordance with the interior technology for a cab that is disclosed in the above described Japanese Unexamined Patent Publication H9 (1997)-105150, and thus, a number of pieces that are formed in accordance with the portions are combined, where the end portion is treated using a rubber seal for attaching a window pane to the outer board in the configuration. Though this configuration is rational at a first glance, the task of assembly is complicated, and a problem arises, where the number of steps in the assembly is great and working efficiency is poor.

In addition, though an increase in the sound absorbing effects by using an installment panel made of polyurethane foam, which absorbs sound when the air conditioning unit that is installed inside operates, is expected in accordance with the prior art that is disclosed in Japanese Unexamined Patent Publication 2002-205528, a problem arises, where the effect of reducing noise from the outside of the cab of the work vehicle, which is greater in volume than the sound when the air conditioning unit operates, cannot be expected.

The present invention is provided in order to solve the above described problems, and an object thereof is to provide an interior member for the cab of a work vehicle, where ease of assembly of the interior member is increased and noise from the outside of the cab can be reduced, a method for forming the same, as well as a wall member.

DISCLOSURE OF THE INVENTION

In order to achieve the above described object, an interior member for the cab of a work vehicle according to the present invention is characterized in that a sound absorbing material is contained between an outer layer material and a foundation body panel.

In addition, an interior member for the cab of a work vehicle according to the present invention is characterized in that a sound absorbing material is contained inside a foundation body panel.

It is preferable in the present invention for the above described foundation body panel to be provided with a structure where ribs cross each other on the rear surface side.

In addition, it is preferable in the present invention for a portion for attaching an electrical wire member to be formed integrally with the above described foundation body panel.

It is preferable in the present invention for a metal plate to be placed on an end surface of a side of the above described foundation body panel.

In addition, it is preferable for a material with heat insulating properties to be used in the above described foundation body panel, and for an air conditioning duct to be integrally formed of the above described material inside the foundation body panel.

Furthermore, it is preferable for the above described foundation body panel to be connected to the cab body with a fastener.

It is preferable in the present invention for the above described foundation body panel to be a member made of a polyurethane resin that is not foamed or that is enlarged through foaming to a volume that is up to three times as large as the original size.

In addition, it is preferable in the present invention for the above described sound absorbing material to be made of semi-hard polyurethane or polyurethane having low resilience which is integrally formed with another member or is a member that is formed through injection after assembly and has continuous foam.

It is preferable for the thickness of the above described sound absorbing material to be 5 mm to 20 mm.

In addition, it is preferable in the present invention for the above described sound absorbing material to be a member that is formed through charging at the time of assembly, and is made of one or more materials from among polyurethane foam, glass wool, PET wool and wool made of recycled plastic materials.

In addition, an interior member for the cab of a work vehicle according to the present invention is characterized in that a foaming resin member is contained between an outer surface member and a foundation body panel made of a polyurethane resin.

Next, a wall member for the cab of a work vehicle according to the present invention is a wall member for the cab of a work vehicle that is provided with the above described interior member, characterized in that a sound absorbing member is charged between a metal plate that is placed on an end surface of a side of the foundation body panel of the interior member and an outer plate having sound blocking properties.

In addition, a wall member for the cab of a work vehicle according to the present invention is a wall member for the cab of a work vehicle that is provided with the above described interior member, characterized in that the outer plate portion inside of which the interior member is placed is formed of a polyurethane resin layer having an outer layer outside of an iron plate.

Next, a method for forming an interior member for the cab of a work vehicle as that described above according to the present invention is characterized by including:

(a) the step of forming a polyurethane resin that is a foundation body panel into a predetermined shape by reaction injection molding method using a first mold for reaction injection molding;

(b) the step of forming an outer layer material into a predetermined shape by a thermoforming process;

(c) the step of installing the outer layer material that has been formed in accordance with the above described thermoforming process within a second mold for reaction injection molding with a gap that corresponds to the thickness of a sound absorbing material vis-à-vis the surface of the panel material that has been fabricated in the above described step (a), and injecting the sound absorbing material into the above described gap so that the sound absorbing material reacts, foams and is cured, and thus, integrating the three layers, the outer layer material, the sound absorbing material and the foundation body panel; and (d) the step of taking out the product by opening the above described second mold for reaction injection molding.

In addition, a method for forming an interior member for the cab of a work vehicle as that described according to the present invention is characterized in that the main structure of an interior member and the cab body are connected by a fastener and after that a sound absorbing foaming material in liquid form is injected from the outer layer material side into a cavity that is formed between the foundation body panel and the cab body, and this sound absorbing foaming material reacts and is cured so as to form a sound absorbing foaming layer.

BEST MODE FOR CARRYING OUT THE INVENTION

Next, concrete embodiments of an interior member and a method for forming the same, as well as a wall member of the cab of a work vehicle according to the present invention, are described in reference to the drawings.

(1) Structure of Interior Member and Wall Member

First Embodiment

Figure 1:
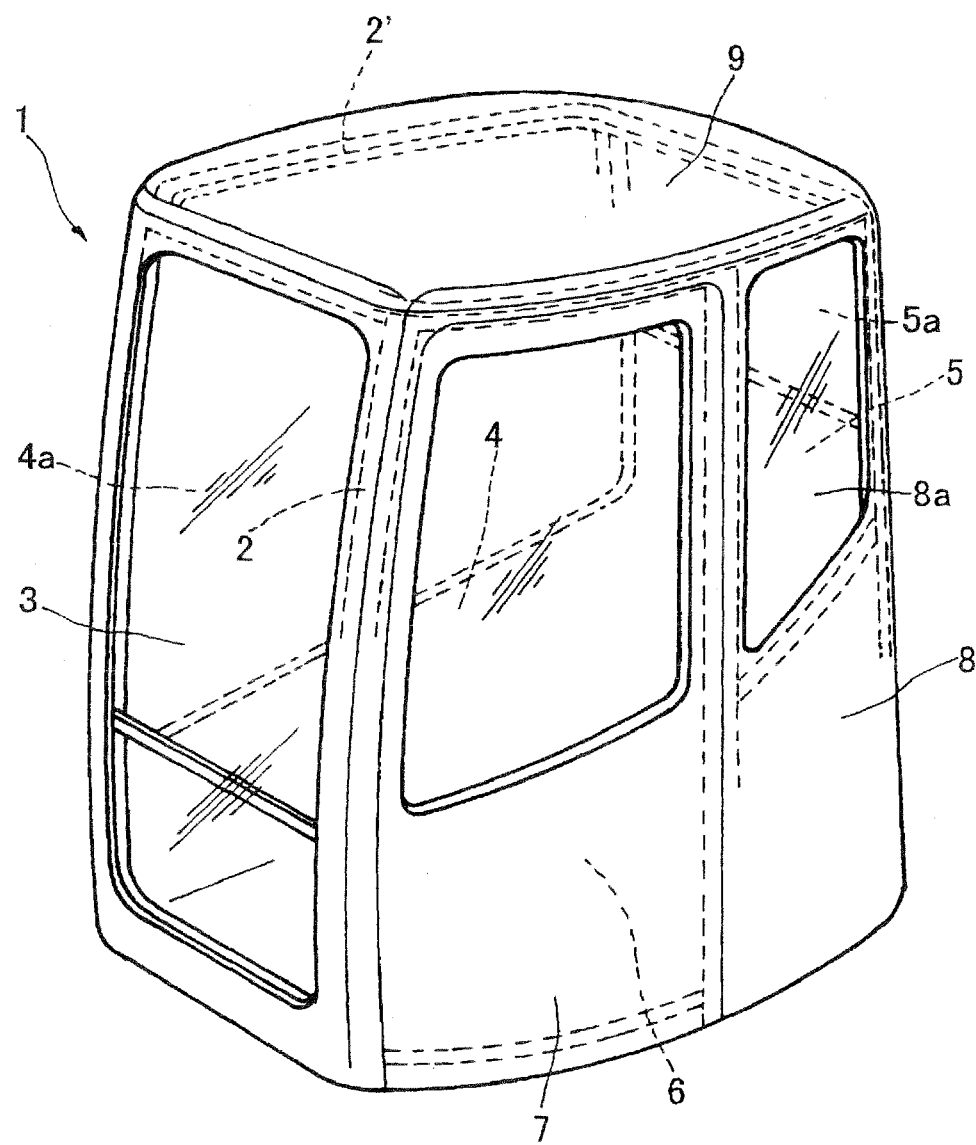
FIG. 1 is a perspective diagram showing the entirety of the cab of a work vehicle to which an interior member and a wall member according to the first embodiment of the present invention are applied.
Figure 2:
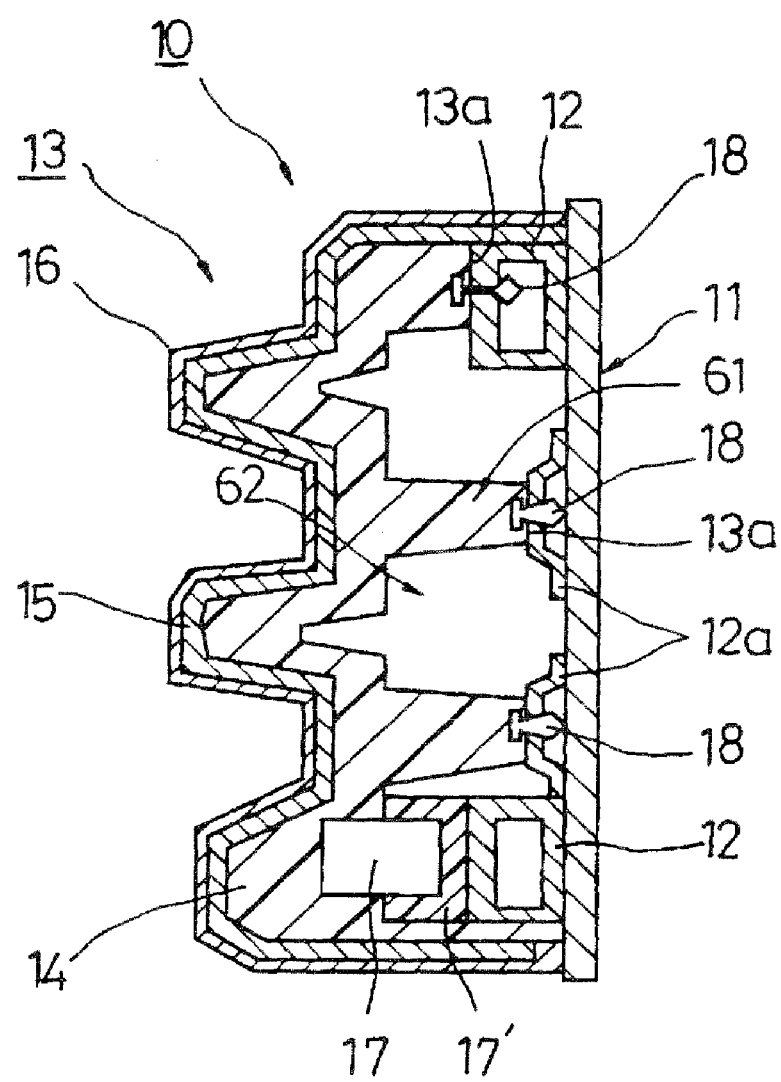
FIG. 2 is a cross sectional diagram schematically showing the configuration of an interior member and a wall member according to the first embodiment.

FIG. 1 is a perspective diagram showing the entirety of the cab of a work vehicle to which an interior member and a wall member according to the first embodiment of the present invention are applied. In addition, FIG. 2 is a cross sectional diagram schematically showing the configuration of an interior member and a wall member according to the present embodiment.

An interior member 13 and a wall member 10 according to this embodiment form the main portions of a cab 1 starting from a side 4 that is opposite to an entrance 6, to a side 5 in the rear portion and to a side 8 which is behind a door 7. They of course can be adopted for door 7. Here, panes are engaged in window forming portions (front window 3, side window 4*a*, rear window 5*a* and rear side window 8*a*) and these portions have the configurations which are the same as those according to the prior art, and therefore, the descriptions thereof are omitted. Here, in FIG. 1, a roof portion is denoted by symbol 9.

Wall member 10 according to the present embodiment has a configuration where a foundation body panel 14, a sound absorbing material (sound absorbing foaming layer) 15 and an outer layer material 16 are compounded to provide interior member 13 on the inner side of the cab, and a so called outer plate 11 made of an iron plate (metal plate) is placed outside. In addition, wall member 10 is provided as a unit in a form that can be assembled to the frames 2 and 2' for forming the cab, and is formed so as to be engaged with and attached to frames 2 and 2' for forming the cab from the outside by means of an engaging member (not shown) so that the outer peripheral portion thereof is placed along frames 2 and 2'.

According to the present embodiment, outer plate 11 of wall member 10 is formed of a thin iron plate in which longitudinal members 12 and mounting brackets 12*a* are welded to a number of places on the inner side in order to attach interior member 13. Here, the attachment of longitudinal members 12 has effects in which the cross section of outer plate 11 provides a contour that increases strength. In addition, interior member 13, which forms the inside, has an integrated structure where a foundation body panel 14 is provided as a portion having a predetermined cross sectional form which is formed of a foaming polyurethane resin that is a plastic material (for example, structural or hard polyurethane resin), a sound absorbing foaming layer 15 having a predetermined thickness is formed along the outer surface of this foundation body panel 14 and outer layer material 16 is formed as the surface layer portion.

The material of the above described foundation body panel 14 can be selected depending on its form and structure at the time of formation from among the resin that is not foamed or that is enlarged through foaming to a volume that is up to three times as large as the original size. At the time of the formation of this foundation body panel 14, a duct 17 for air conditioning which supplies air to the inside of the cab for air conditioning is integrally formed at the time of assembly in an appropriate place on the outer surface side (side that is connected to outer plate 11) of foundation body panel 14 in such a manner that an air vent (not shown) to the inside of the cab is formed at the same time. Thus, the inner surface of this duct 17 is directly formed through a mold, and therefore, can be freely formed in bent form in addition to straight form where the inner surface thereof can be finished as a smooth surface. Here, a side of the formed portion along duct 17 is left in a state with an opening because of the forming process, and therefore, a closing member 17' for covering this open portion is separately formed so as to be connected to this open portion, and thereby, this open side is covered so that duct 17 can be formed. Closing member 17' is attached to the above described formed portion along duct 17 by using an adhesive on the surfaces of the two portions which make contact with each other or by joining them with screws. Here, in this case, it is preferable for the portions of the surfaces which make contact with each other to have a socket and spigot joint structure (not shown) so that no step can be created on the inner surface of the duct. In addition, though not shown, an engaging structure is formed in an open portion of the formed portion of the duct along the surface of closing member 17' that makes contact with the formed portion while a protrusion that is to be engaged with the above described engaging structure is formed on the surface of closing member 17' that makes contact with the formed portion so that the two members can be secured with friction from the engagement.

In addition, it is preferable for a rib structure to be provided inside and on the rear side of foundation body panel 14 so that a closed space 62 is formed of ribs 61 and outer plate 11. As a result of this, sound waves of noise which enter into closed space 62 from the outside cause random reflection inside this closed space 62 in such a manner that only the sound waves that have been attenuated due to interference and the like transmit through foundation body panel 14, and therefore, it becomes possible to enhance sound absorbing effects, and at the same time, to increase the strength of foundation body panel 14. Furthermore, a sound absorbing material may be charged into closed space 62 to the extent that random reflections are not hindered so that sound absorbing effects can be enhanced.

The above described sound absorbing foaming layer 15 is a foaming resin material which is made of a semi-hard polyurethane resin having continuous foam or polyurethane resin having low resilience in accordance with a below described forming method, and is integrally formed between foundation body panel 14 that is formed of a hard polyurethane resin and outer layer material 16 so as to have a predetermined thickness which is uniform throughout the entire surface.

The above described outer layer material 16 is formed along the outer surface of the above described sound absorbing foaming layer 15 so as to have approximately uniform thickness. As for this outer layer material 16, water expellant and breathable materials of which the surfaces have a good feel such as vinyl leathers, polyolefin based materials having a leather-like sheet on the surface (for example, trade name "Pef" made by Toray Corporation), high density cotton fiber textiles, high density thermoplastic polyamide, such as NYLON, textiles and high density polyester textiles are selected and utilized. Here, in the case of any of the above described vinyl leathers and polyolefin based materials having a leather-like sheet on the surface, ornamental properties can be enhanced by providing a grain pattern or a pattern due to an embossing process to the surfaces. In addition, in the case of any of the above described textiles, ornamental properties and a feel which are different from the above described cases of sheet materials can be gained by the appearance and the color tone which are particular to the textile.

A predetermined number of engagement holes are provided in advance in longitudinal members 12 and mounting brackets 12*a* which have been attached to outer plate 11, and opening type clips 18, for example, are placed and installed on a side end surface 13*a* of foundation body panel 14 on the above described interior member 13 side so as to correspond to the engagement holes that are provided on the above described outer plate 11 side, and then, these clips 18 are engaged in the engagement holes on the outer plate side so as to be secured so that inner member 13, where the above described foundation body panel 14, sound absorbing foaming layer 15 and outer layer material 16 are compounded, can be joined to outer plate 11. Here, in addition to these clips 18, a fastener (not shown) which can be connected to outer plate 11 is provided in at least one place of the above described side end surface 13a, and interior member 13 is secured to outer plate 11 from behind by the fastener. By doing this, the fixture with the fastener, in addition to the engagement by the above described clips 18 at the places where they are placed, can make outer plate 11 and interior member 13 be firmly connected to each other without fail. Furthermore, in the case where so called one touch fasteners such as snap type clips or sliding fasteners are used as clips 18 for connection, assembling can be made easy and work efficiency can be increased.

Here, interior member 13 can be joined to outer plate 11 by means of adhesion. In this case, clips 18 which are installed in mounting brackets 12a that are attached to outer plate 11 and interior member 13 can of course be omitted.

The above described outer layer material 16 is fabricated so as to be a little greater in size than interior member 13 so that the end portions thereof can be bent inward of interior member 13 in order to make outer layer material 16 join to outer plate 11, and thereby, handling of interior member 13 in a state of a unit can be made easier, the end portions can be prevented from protruding to the outside after the assembly, and the interior can be finished beautifully.

In interior member 13 having such a configuration, outer layer material 16, foundation body panel 14 and other materials are integrally layered and formed and a sound absorbing foaming layer 15 is contained between outer layer material 16 and foundation body panel 14, and thereby, efficient sound blocking/sound absorbing properties are provided, and in addition, heat insulating effects can also improved. In addition, foundation body panel 14 is made of a polyurethane resin, which can be formed into an arbitrary shape by a reaction injection molding method so that cross-sectional strength can be increased and a variety of works become possible in the internal structure. Furthermore, foundation body panel 14 has heat insulating properties reducing the transfer of heat between the outside and the inside of the cab so that the comfort of the inside of the cab at the time of operation can be maintained in sweltering heat or in cold weather. In addition, duct 17 is integrally formed with foundation body panel 14 having heat insulating properties so that air conditioning can be provided efficiently, reducing energy loss. Furthermore, outer layer material 16 can provide comfort to an operator by enhancing ornamental properties and a feel, and in addition, this outer layer material 16 is provided with water expellant properties and air permeability, and thereby, exercises sound absorbing functions together with internal foaming sound absorbing layer 15. Dirt can be prevented from entering into outer layer material 16 and stains, even if they are made, can be wiped away with water, and therefore, outer layer material 16 can be effectively used for the cab of a construction machine or agricultural machine. Here, the hard polyurethane resin that forms foundation body panel 14 can be enlarged in volume by increasing the ratio of foaming so that weight for predetermined dimensions of the form can be reduced and heat insulating effects can be increased. Meanwhile, in the case where the ratio of forming is reduced, the cross-sectional strength can be increased. Accordingly, it is preferable to select the ratio of foaming before forming the interior member depending on the form of its structure.

As for the thickness of each layer that forms the above described interior member 13, it is preferable for the thickness of outer layer material 16 to be in a range from 100 μm to 250 μm, for the thickness of sound absorbing foaming layer to be in a range from 5 mm to 20 mm, and for the thickness of foundation body panel 14 (polyurethane resin) to be in a range from 2 mm to 4 mm in the case of non-foaming, and in a range from 5 mm to 10 mm in the case of foaming. These ranges of the dimensions are collectively determined so that the thickness of the interior member can be set when the respective dimensions are combined.

In addition, duct 17 for air conditioning and rib 61 can be integrally formed inside as described above at the time when foundation body panel 14 is formed, and portions for holding electrical wires and the like (portions for attaching electrical wire members) can be provided, and portions for attaching functional parts and the like can be formed at the time of molding so that interior member 13 can be provided as a unit by attaching predetermined apparatuses and wires to these portions for attaching. Furthermore, this interior member 13 can be assembled to outer plate 11 as one panel so as to be provided as a unit of wall member 10. Thus, wall member 10 is used as a unit when forming cab 1 in order to significantly increase work efficiency in an assembling process of cab 1 which can be streamlined. In addition to ornamental effects of the surface of the interior and effects of reducing noise by means of the sound absorbing layer/sound blocking layer, heat insulating effects can be gained as well due to the layered structure of interior member 13.

Here, wall member 10 may be formed in such a manner that outer plate 11 can be secured in advance to frames 2 and 2' for forming the cab by means of welding or the like and interior member 13 where foundation body panel 14, sound absorbing foaming layer 15 and outer layer material 16 are compounded can be placed from behind.

Second Embodiment

Figure 3:
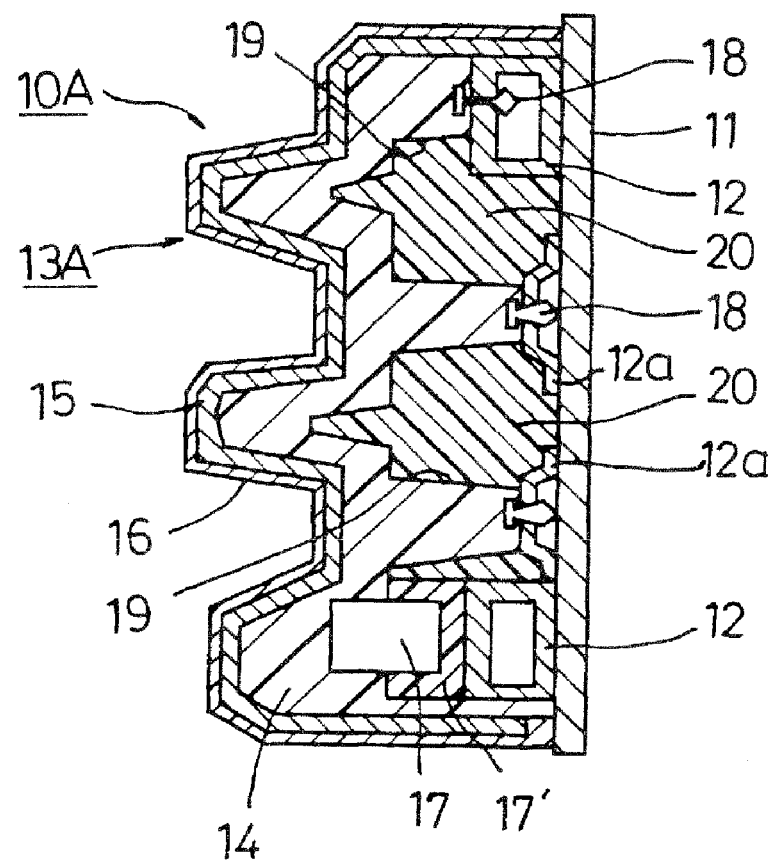
FIG. 3 is a cross sectional diagram showing the configuration of an interior member and a wall member according to the second embodiment.

FIG. 3 is a cross sectional diagram showing the configuration of an interior member and a wall member according to the second embodiment of the present invention. A wall member 10A according to this embodiment is provided by adding an internal sound absorbing foaming layer to the configuration according to the above described first embodiment. The configurations of the other parts are approximately the same as those of the above described embodiment, and therefore, the same symbols as those of the above described embodiment are used for the parts having the same configurations, and the detailed descriptions thereof are omitted.

Wall member 10A of this embodiment is provided with an interior member 13A where an outer layer material 16 and a sound absorbing foaming layer 15 are layered and formed on the surface side (the inside of the cab when used), as described above. A sound absorbing material (sound absorbing foaming layer) 20 is contained in a cavity 19 that is formed between foundation body panel 14 and outer plate 11 of this interior member 13A such that after outer plate 11 and the interior member 13 are connected by clips 18, a sound absorbing foaming material in liquid form which then reacts and is cured, is injected into a small hole that has been provided from the surface of outer layer material 16 so that the cavity is connected to the outside. Here, this sound absorbing foaming layer 20 is formed of semi-hard polyurethane having continuous foams, or polyurethane having low resilience in the same manner as the above described sound absorbing forming layer 15.

Interior member 13A and wall member 10A according to the second embodiment which are formed as described above have the above described working effects as whole, and in addition to this, sound absorbing functions are exercised by contained sound absorbing foaming layer 20, and thus, sound absorbing effects can further be increased. Accordingly, they can be effectively used for panels that are placed in a wall portion that is close to the noise source.

Third Embodiment

Figure 4:
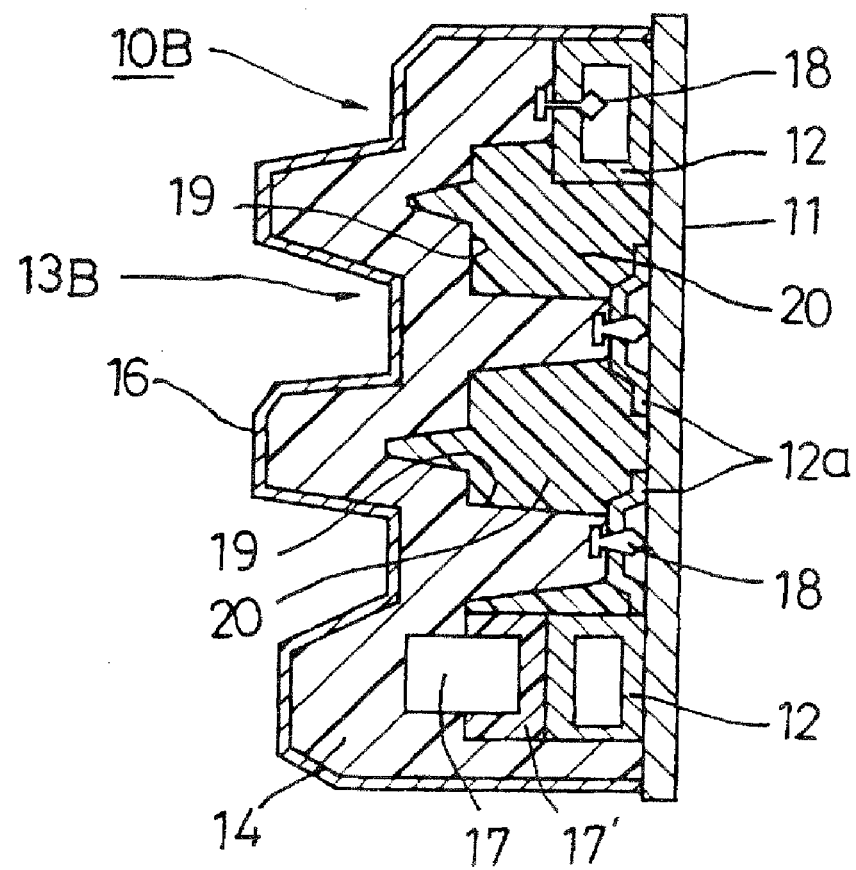
FIG. 4 is a cross sectional diagram showing the configuration of an interior member and a wall member according to the third embodiment.

FIG. 4 is a cross sectional diagram showing the configuration of an interior member and a wall member according to the third embodiment of the present invention. A wall member 10B of this embodiment is formed by not providing a sound absorbing forming layer to the surface side of interior member 13B and placing a sound absorbing forming layer 20 within a cavity 19 in a foundation body panel 14. Accordingly, the same symbols as those of the above described embodiment are used for the respective parts, of which the detailed descriptions are omitted.

Though interior member 13B and wall member 10B having such a configuration have sound absorbing effects which are not so high as those having the configuration of the above described embodiments due to the lack of the sound absorbing foaming layer on the surface layer, foundation body panel 14, the contained sound absorbing foaming layer 20 and outer plate 11 can exercise sound absorbing/sound blocking functions and at the same time the above described secondary functions (heat insulating properties, ornamental properties) can be gained, and the cost can be reduced by omitting the sound absorbing foaming layer on the above described surface layer side.

Fourth Embodiment

Figure 5:
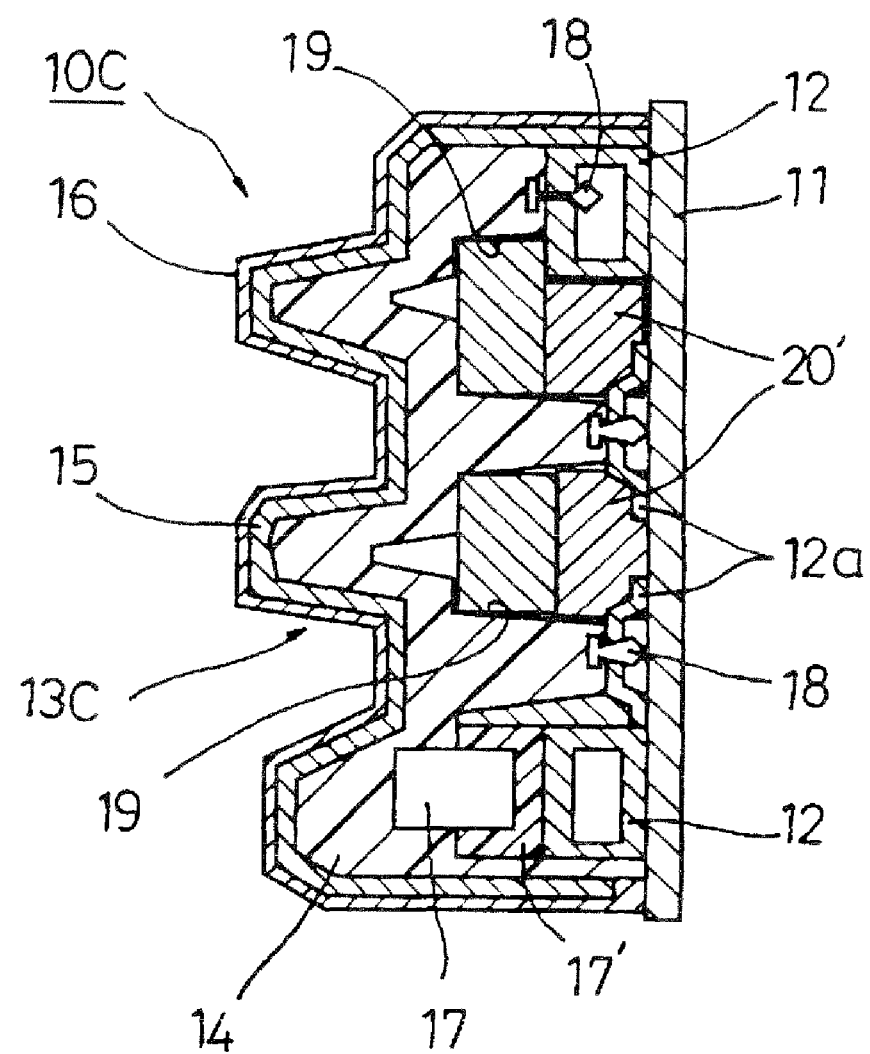
FIG. 5 is a cross sectional diagram showing the configuration of an interior member and a wall member according to the fourth embodiment.

FIG. 5 is a cross sectional diagram showing the configuration of an interior member and a wall member according to the fourth embodiment of the present invention. A wall member 10C of this fourth embodiment essentially has a configuration where a sound absorbing layer is contained in that of the above described first embodiment. Accordingly, the same symbols are used for the parts having the same structure as those of the above described embodiment, of which the detailed descriptions are omitted.

Wall member 10C of this embodiment is formed by inserting a block of a foaming resin material (for example semi-hard polyurethane having continuous foam, polyurethane foam, or the like) that is formed in advance so as to fit in a cavity 19 that is formed between foundation body panel 14 (polyurethane resin) and outer plate 11 from among the members that form interior member 13C, as a sound absorbing material (sound absorbing layer) 20' that is contained in cavity 19. In addition, instead of this foaming resin material, sound absorbing layer 20' may be formed so as to be contained by filling the above described cavity 19 with a sound absorbing material in indeterminate form (wools such as glass wools, PET wools, and wools made of recycled plastic materials are solely used or a number of types are combined for use).

Interior member 13C and wall member 10C of the present embodiment have a configuration where a sound absorbing block or a sound absorbing material in indeterminate form which has been separately prepared is inserted into the above described cavity 19 during the fabrication process so that sound absorbing layer 20' is contained, and therefore, sound absorbing properties of this contained sound absorbing material can be selected so as to increase the sound absorbing effects. In addition, this is different from a troublesome method where a sound absorbing material is injected from the outside so as to fill in a cavity after interior member 13C and outer plate 11 have been connected to each other, and therefore, there is an advantage where any portions of outer layer material 16 are not damaged, making the finish beautiful.

Fifth Embodiment

Figure 6:
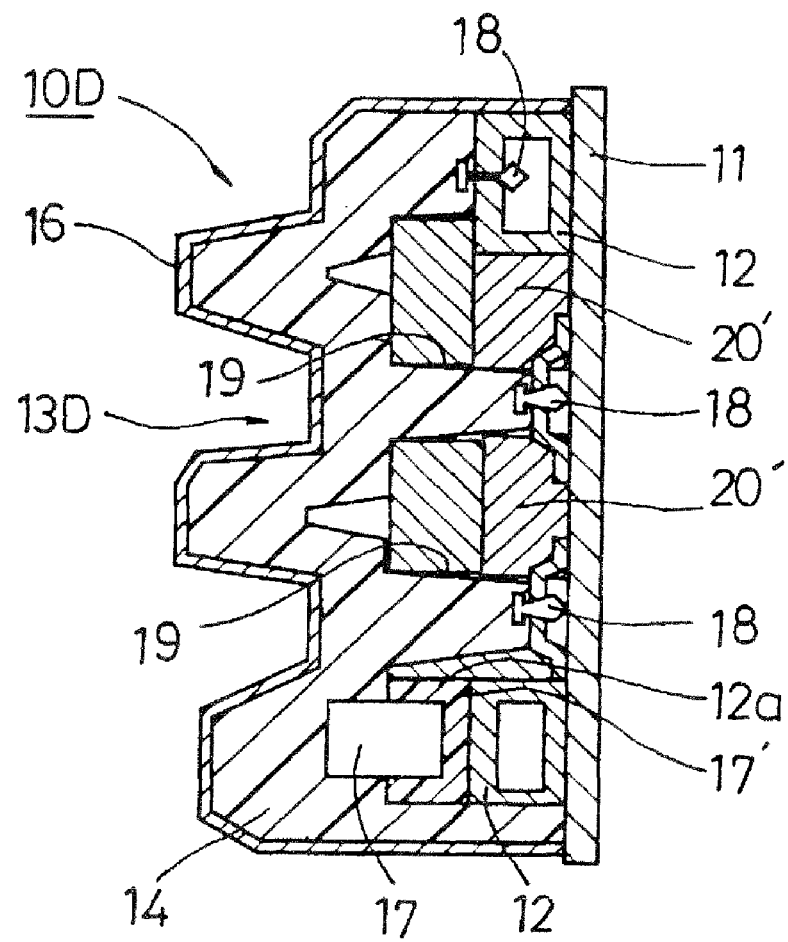
FIG. 6 is a cross sectional diagram showing the configuration of an interior member and a wall member according to the fifth embodiment.

FIG. 6 is a cross sectional diagram showing the configuration of an interior member and a wall member according to the fifth embodiment of the present invention. Similarly to the wall member of the fourth embodiment, a wall member 10D of this fifth embodiment is formed by inserting a block of a foaming resin material (for example, semi-hard polyurethane having continuous foam, polyurethane foam or the like) that is formed in advance so as to fit in a cavity 19 that is formed between a foundation body panel 14 and an outer plate 11 in interior member 13D having a configuration where a sound absorbing foaming layer is not provided inside outer layer material 16. In addition, the above described cavity 19 is filled in with a sound absorbing material in indeterminate form (for example, glass wool, PET wool, wool made of recycled plastic materials are used alone or a number of types are combined for use), instead of the above foaming resin material, so that a sound absorbing layer 20' is formed and contained.

In interior member 13D and wall member 10D according to the present embodiment, the same working effects as those in interior member 13C and wall member 10C according to the above described fourth embodiment can be gained.

Sixth Embodiment

Figure 7:
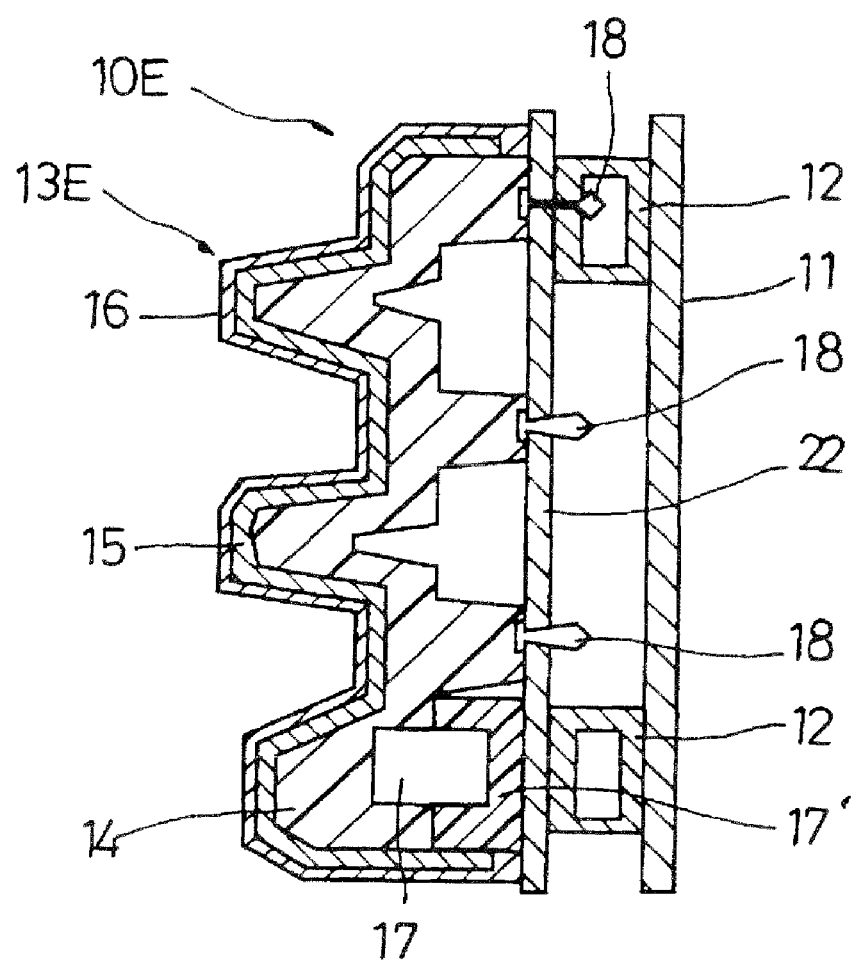
FIG. 7 is a cross sectional diagram showing the configuration of an interior member and a wall member according to the sixth embodiment.

FIG. 7 is a cross sectional diagram showing the configuration of an interior member and a wall member according to the sixth embodiment of the present invention. A wall member 10E of this sixth embodiment has a configuration where an iron plate is contained in interior member 13E, and other parts of the basic configuration are approximately the same as in the wall member of the above described first embodiment. Accordingly, the same symbols as those in the above described embodiment are used for parts that are the same or similar in the configuration, and the detailed descriptions thereof are omitted.

This wall member 10E has a configuration where an iron plate 22 is attached to a layer made of an outer layer material 16, a sound absorbing foaming layer 15 and a foundation body panel 14 which form interior member 13E, so as to run along the end surface of this foundation body panel 14, and an outer plate 11 is connected via this iron plate 22 by means of clips 18. A number of clips 18 for this connection are placed at predetermined points in such a manner that the base ends of these are buried in foundation body panel 14 at its forming step at the time when interior member 13E is formed, or clips 18 are planted later, attachment holes for the connection to these clips 18 are provided to the above described iron plate 22 so that the connection holes correspond to the position of clips 18, and the end surface of foundation body panel 14 and iron plate 22 are joined together with an adhesive, and at the same time, the above described clips 18 are engaged with the engagement holes that have been provided in iron plate 22 for the integration. Clips 18 that have been provided in this manner are engaged with engagement holes that are provided in advance in longitudinal members 12 for reinforcement that have been attached to the inner surface side of outer plate 11, and thereby, interior member 13E is connected to the inner surface side of outer plate 11 for integration.

Interior member 13E and wall member 10E, which are formed in this manner, have functions as described above, because of their layered structure, and furthermore, a sound blocking function is added because noise reflects multiple times in the space between the contained iron plate 22 and outer plate 11, and thus, the level of noise that enters into the cab from the outside can be lowered. In addition, the double structure of iron plate 22 which is contained so as to be a sound blocking plate, and outer plate 11 enhances the rigidity, making handling easier in spite of slight increase in the weight, and effects are gained, where a function of protecting the inside of the cab against a large load that is received from the outside is added as a result of an increase in the cross sectional strength.

According to the present embodiment, iron plate 22 may be a metal plate made of another material, as long as it provides a similar sound blocking function. In addition, though iron plate 22 is contained in interior member 13E in the configuration, it may be provided in advance on the outer plate 11 side. In this case, iron plate 22 and interior member 13E are connected by means of the above described clips 18, in the same manner as in the case where an interior member is connected to outer plate 11 by providing engagement holes in iron plate 22. In the case where iron plate 22 is attached in advance to the outer plate 11 side, a function as a sound blocking plate and a function of enhancing the rigidity are also gained.

Seventh Embodiment

Figure 8:
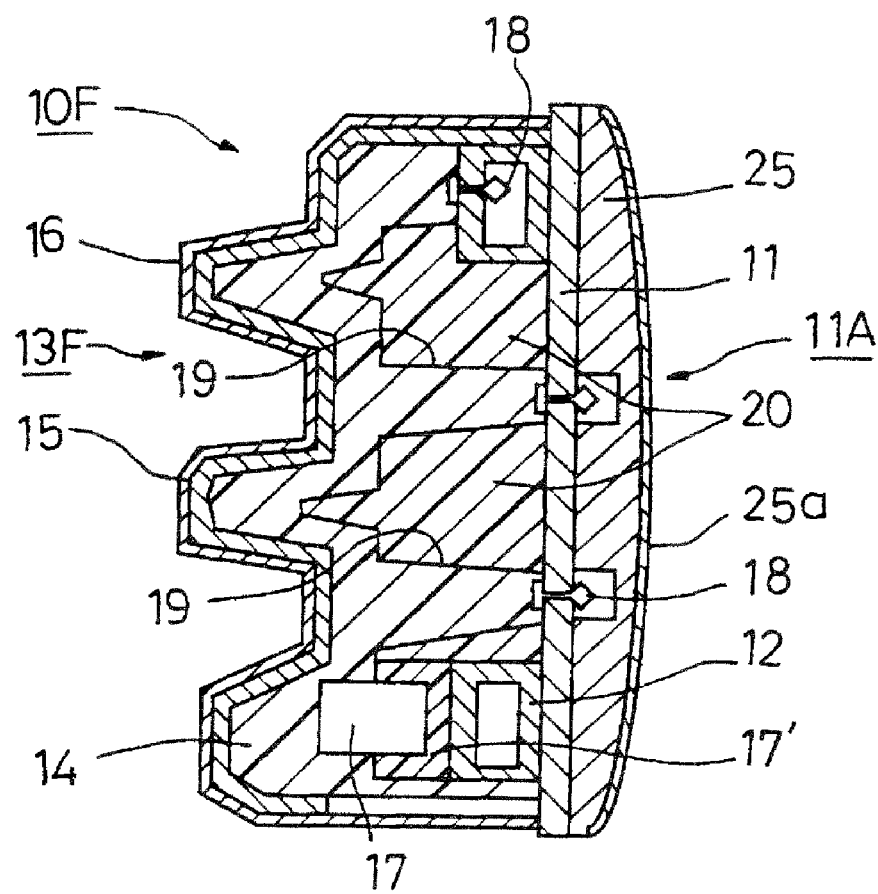
FIG. 8 is a cross sectional diagram showing the configuration of an interior member and a wall member according to the seventh embodiment.

FIG. 8 is a cross sectional diagram showing the configuration of an interior member and a wall member according to the seventh embodiment of the present invention. A wall member 10F of this seventh embodiment has a basic configuration that is the same as that of the above described second embodiment, and is provided with an outer plate portion 11A where an outer layer (polyurethane resin layer) 25 having a three-dimensional outer form made of a foaming resin material (for example, structural or hard polyurethane resin) is added to the outside of outer plate 11 so as to have a layered structure. Here, the same symbols as those in the above described embodiments are used for parts which are structurally the same or similar as in the above described embodiments, and the detailed descriptions thereof are omitted.

An outer layer 25a of the above described outer plate portion 11A may have a paint-like quality (for example, outer layer 25a is formed of a paint film or a resin layer that includes paint), and is preferably formed in a convex curved surface, so as to be usable also as an exterior panel of the cab, which is effective for emphasizing aesthetics in the design with weather resistance. In addition, outer layer 25a may be formed of a hard material, taking deformation due to external force into consideration. Furthermore, interior member 13F is formed in the same manner as described above, where a sound absorbing foaming layer 20 is injected and formed in a cavity 19 that is formed between a foundation body panel 14 and an outer plate (iron plate) 11.

Accordingly, interior member 13F and wall member 10F of this embodiment functionally have the same working effects as those of the above described second embodiment, and in addition, outer plate portion 11A is added, and thereby, synergic effects are obtained where effects of enhancing the aesthetics of the appearance and heat insulating and sound absorbing effects are effectively increased.

Eighth Embodiment

Figure 9:
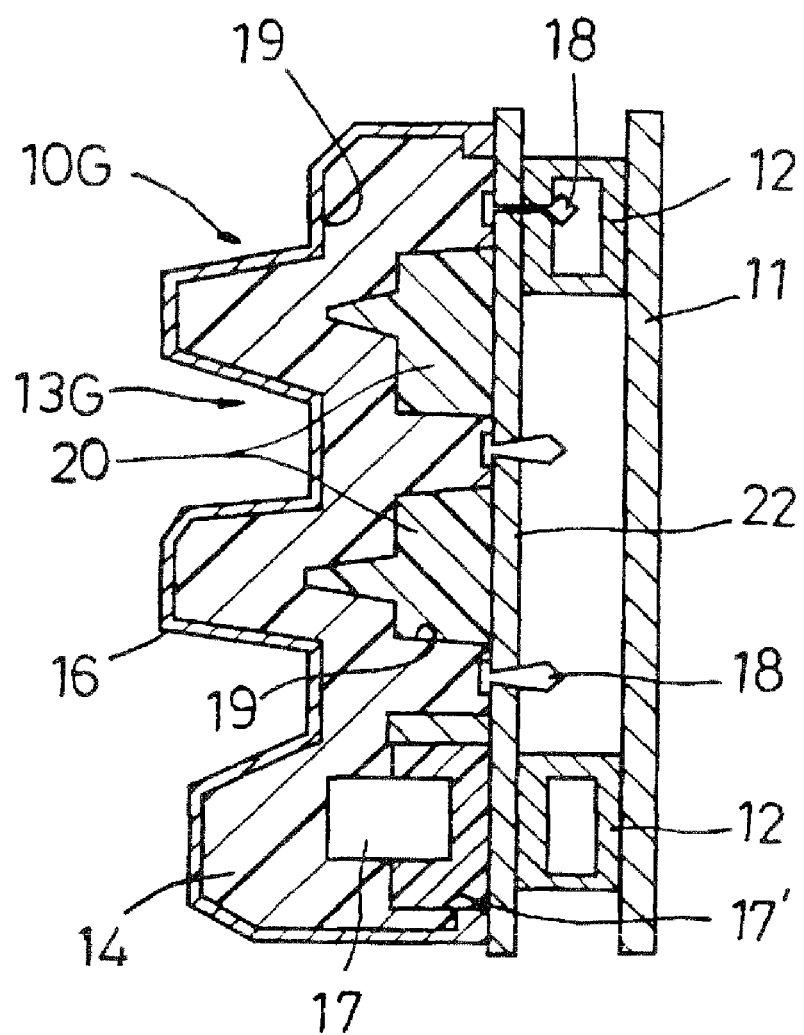
FIG. 9 is a cross sectional diagram showing the configuration of an interior member and a wall member according to the eighth embodiment.

FIG. 9 is a cross sectional diagram showing the configuration of an interior member and a wall member according to the eighth embodiment of the present invention. A wall member 10G of this eighth member has approximately the same basic configuration as that of the above described third embodiment, and is formed by combining this with an interior member 13G that contains an iron plate 22, as well as an outer plate 11. Accordingly, the same symbols as those of the above are used for portions which are structurally the same or similar to the above, and the detailed descriptions thereof are omitted.

Wall member 10G of the present embodiment has a configuration where an outer layer material 16 is directly formed on the front surface side of a foundation body panel 14 that has been formed so as to have predetermined dimensions, iron plate 22 is made to adhere and is connected by means of a number of clips 18 to foundation body panel 14 so as to run along the end surface of this foundation body panel 14, and a cavity 19 that is formed between this iron plate 22 and foundation body panel 14 is filled in with a sound absorbing foaming layer 20, so that an interior member 13G is formed, and interior member 13G having this configuration is connected to an outer plate 11 that is reinforced with longitudinal members 12 by means of the above described clips 18, where clips 18 are engaged with engagement holes that have been provided in these longitudinal members 12.

Interior member 13G and wall member 10G having the above described configuration have basically the same working effects as those of the above described third embodiment, and furthermore, vibration controlling/sound blocking effects due to the contained iron plate 22 are added, and the contained sound absorbing foaming layer 20 can provide sound absorbing/sound blocking functions, even though no sound absorbing foaming layers exist directly beneath outer layer material 16.

Ninth Embodiment

Figure 10:
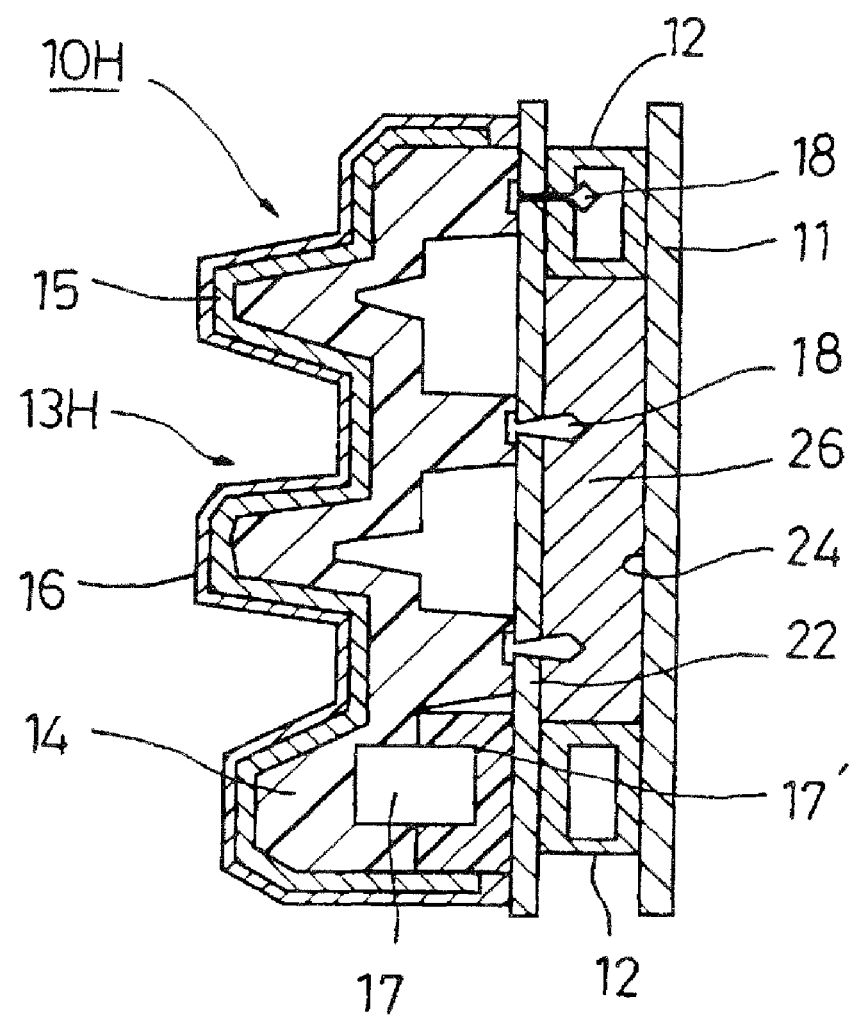
FIG. 10 is a cross sectional diagram showing the configuration of an interior member and a wall member according to the ninth embodiment.

FIG. 10 is a cross sectional diagram showing the configuration of an interior member and a wall member according to the ninth embodiment of the present invention. A wall member 10H of this ninth embodiment has the same basic configuration as that of the above described sixth embodiment, and is formed by combining this with an interior member 13H that contains an iron plate 22, as well as an outer plate 11. Accordingly, the same symbols as those of the above are used for parts that are structurally the same or similar to the above, and the detailed descriptions thereof are omitted.

In this wall member 10H, an iron plate 22 is made to adhere to the end surface of a foundation body panel 14 so as to be contained in interior member 13H that is formed by layering outer layer material 16, sound absorbing foaming layer 15 and this foundation body panel 14, and at the same time, the above described iron plate 22 is connected by means of clips 18 that have been planted at the end surface portion of foundation body panel 14, where longitudinal members 12 of outer plate 11 are also integrally connected, as described above, and furthermore, a cavity 24 that is between the above described iron plate 22 and outer plate 11 is filled in with a foaming resin material that becomes a sound absorbing material, as described above, so that sound absorbing layer 26 having continuous foam is formed.

Interior member 13H and wall member 10H which are formed in the above described manner have working effects as those described above, and furthermore, a sound absorbing function in the portion of a sound absorbing layer 26 that has been formed between the contained iron plate 22 and outer plate 11 is added and therefore, entrance of noise into cab can be blocked, so as to further reduce propagation of noise. In addition, by doing this, effects can be gained, where the connection between interior member 13H and outer plate 11 is made stable through the adhesiveness of the injected resin material.

(2) Examples where Interior Member is Applied

Figure 11:
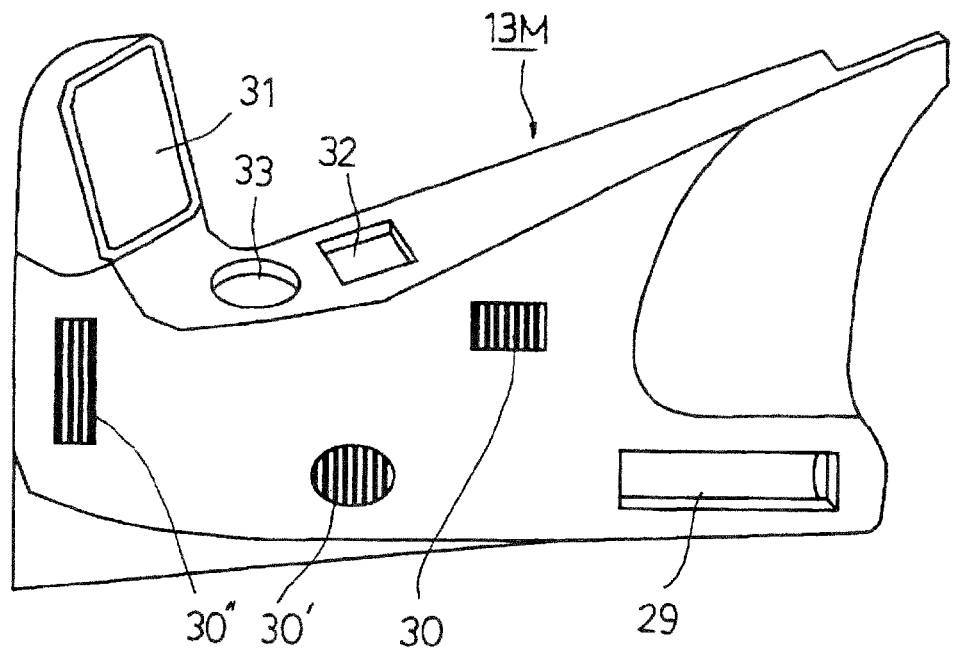
FIG. 11(*a*) is a perspective diagram showing a concrete example of the appearance when an interior member according to the present invention is applied, and FIG. 11(*b*) is a diagram showing the same as viewed from the rear side.
Figure 11:
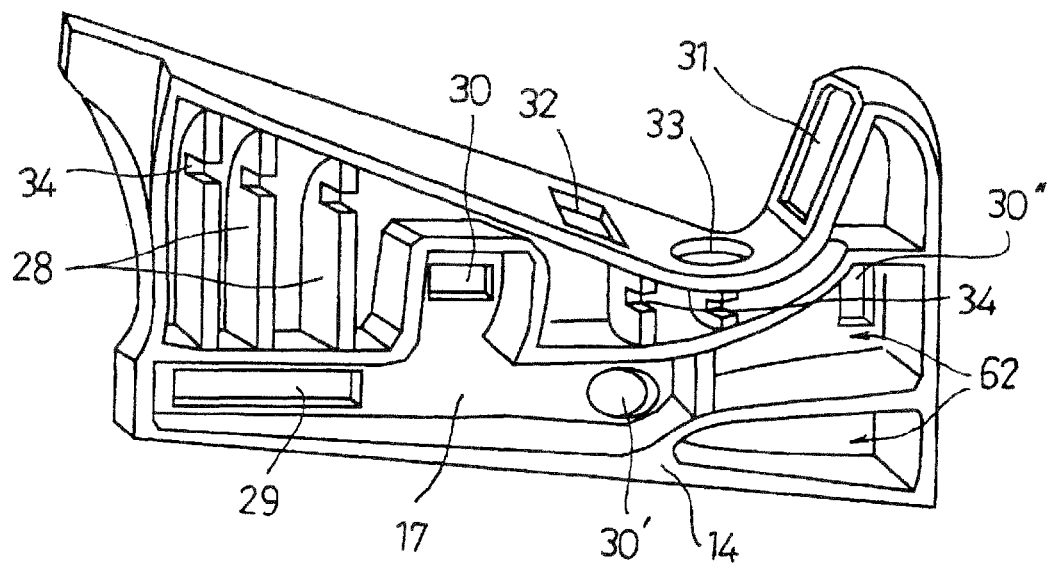

FIG. 11(a) is a perspective diagram showing a concrete example of the appearance where an interior member according to the present invention is applied, and FIG. 11(b) is a diagram showing the same as viewed from the rear side.

An interior member 13M of this embodiment is placed on the right side of the operator's seat in the cab of a construction machine, and an outer layer material having a good feel and that is helpful for designing is selected for use as the outer surface of interior member 13M. As for the internal structure, a duct 17 for air conditioning (shown in a state where a closing member 17' is not attached) is formed as shown in FIG. 11(b), and a great number of reinforcing ribs 28 are placed so as to provide enough strength to hold the entire structure. In addition, in duct 17, an opening 29 for attaching a duct to an air conditioner (not shown), and air vents 30, 30' and and 30" are provided at arbitrary points, and louvers are provided to these air vents 30, 30' and 30" integrally or after having been separately formed. An appropriate structure (for example, a structure of which the degree of effect of noise reduction is appropriate for the object) from among the structures of the interior members according to the above described first to sixth embodiments and the eighth embodiment can be adopted as the cross sectional structure of this interior member.

In addition, at the time of formation, a portion for attaching an accessory apparatus (for example, a monitor incorporating portion 31), an ashtray incorporating portion 32, a cup holder attaching portion 33 and the like can be integrally formed in necessary places. Furthermore, notches 34 for the attachment of wire harnesses for electrical wiring which are connected to the attached apparatuses are provided in ribs 28 on the inside, and thereby, wires can be engaged with these notches 34 for the attachment at the time of the wiring task, so as to be attached without needing to use any special fasteners. An electrical wire member is engaged with and secured to a portion for the attachment of an electric wire member that includes channels for placing electrical wire cords and holders for connectors, of which a typical example is the above described notches 34 for the attachment of wire harnesses, and thereby, a stable structure is gained in a work vehicle that vibrates a lot, and electrical trouble can be prevented and parts can be provided in modules, reducing the number of steps for assembly.

(3) Method for Forming Interior Member

Next, a method for forming an interior member according to the present invention is described, for the example of the above described first and second embodiments.

Figure 12:
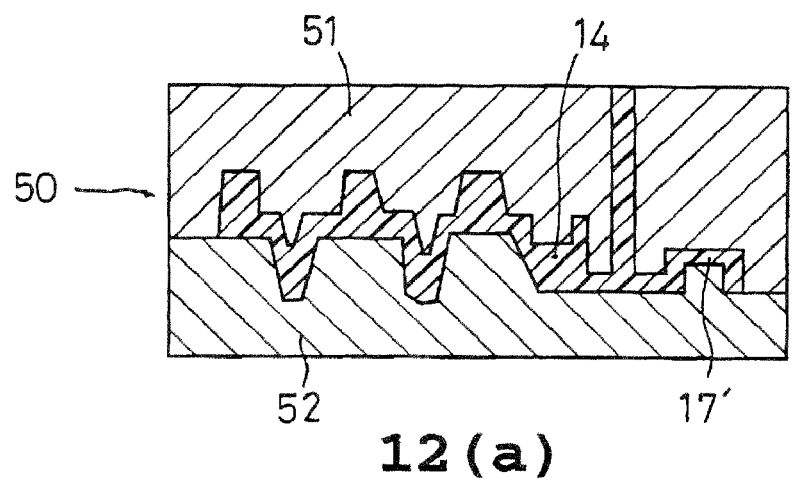
FIGS. 12(*a*) to 12(*c*) are diagrams showing an example of a procedure for forming an interior member.
Figure 12:
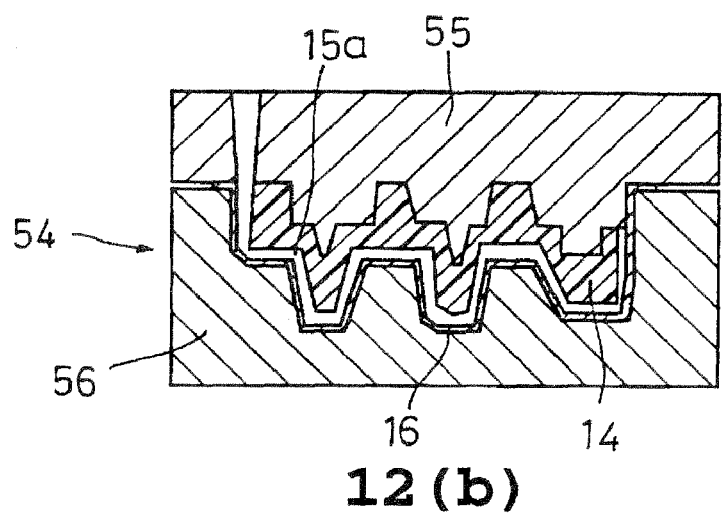
Figure 12:
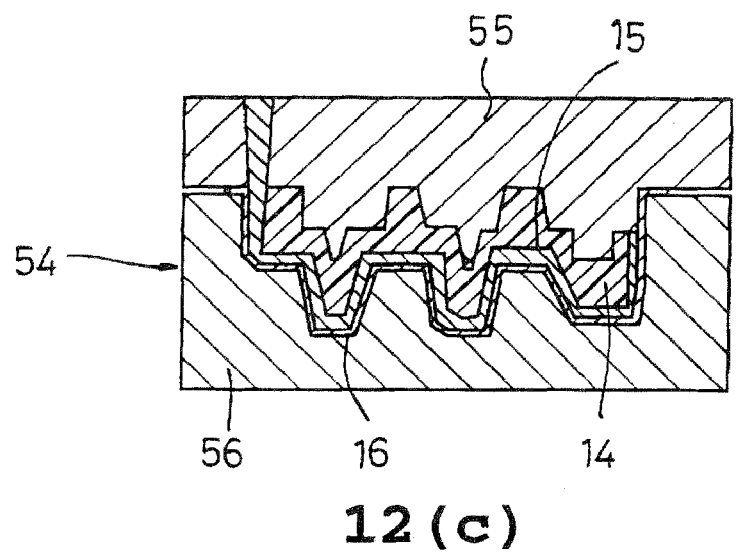
Figure 13:
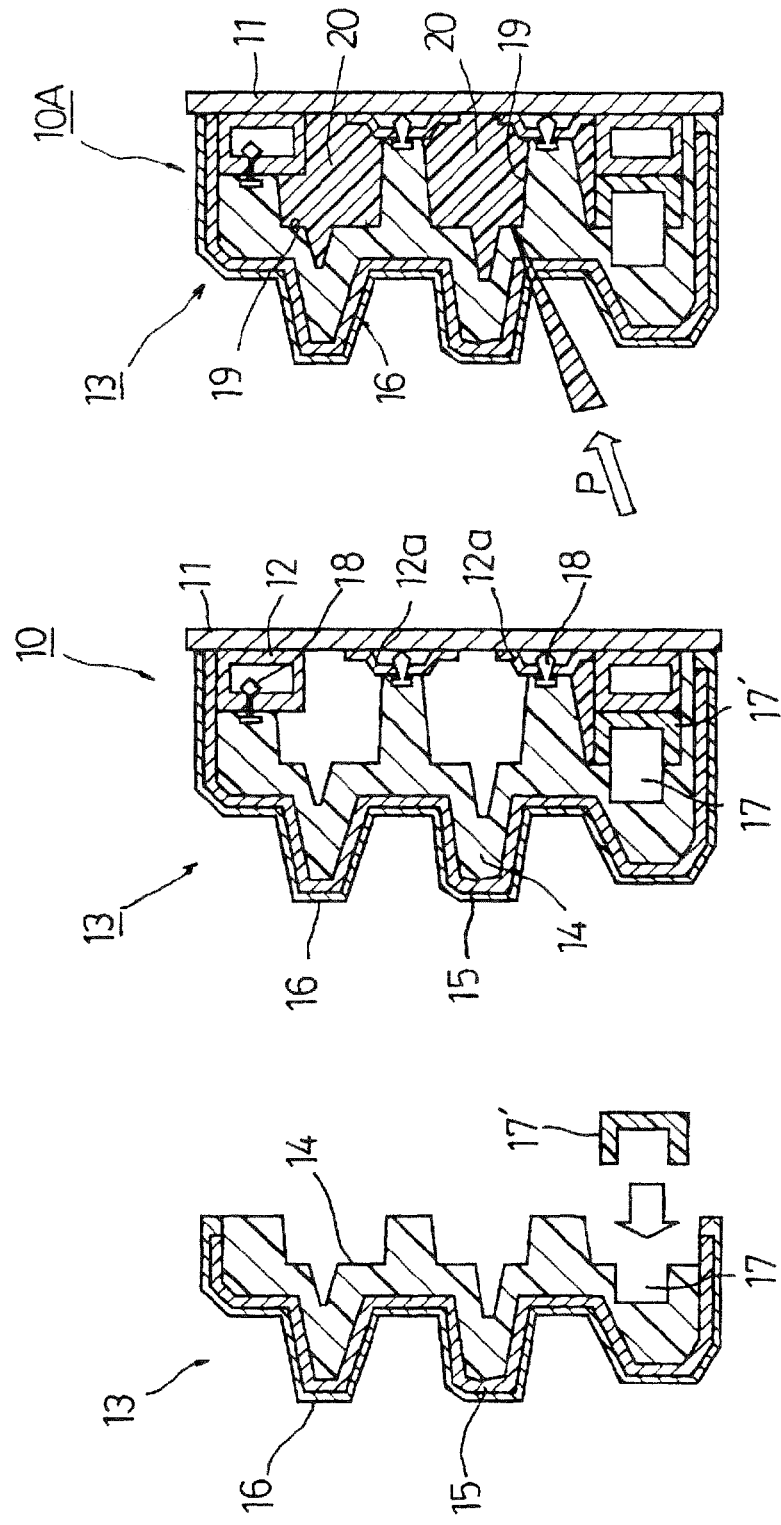
FIGS. 13(*a*) to 13(*c*) are diagrams showing an example of an assembly procedure of an interior member.
Figure 14:
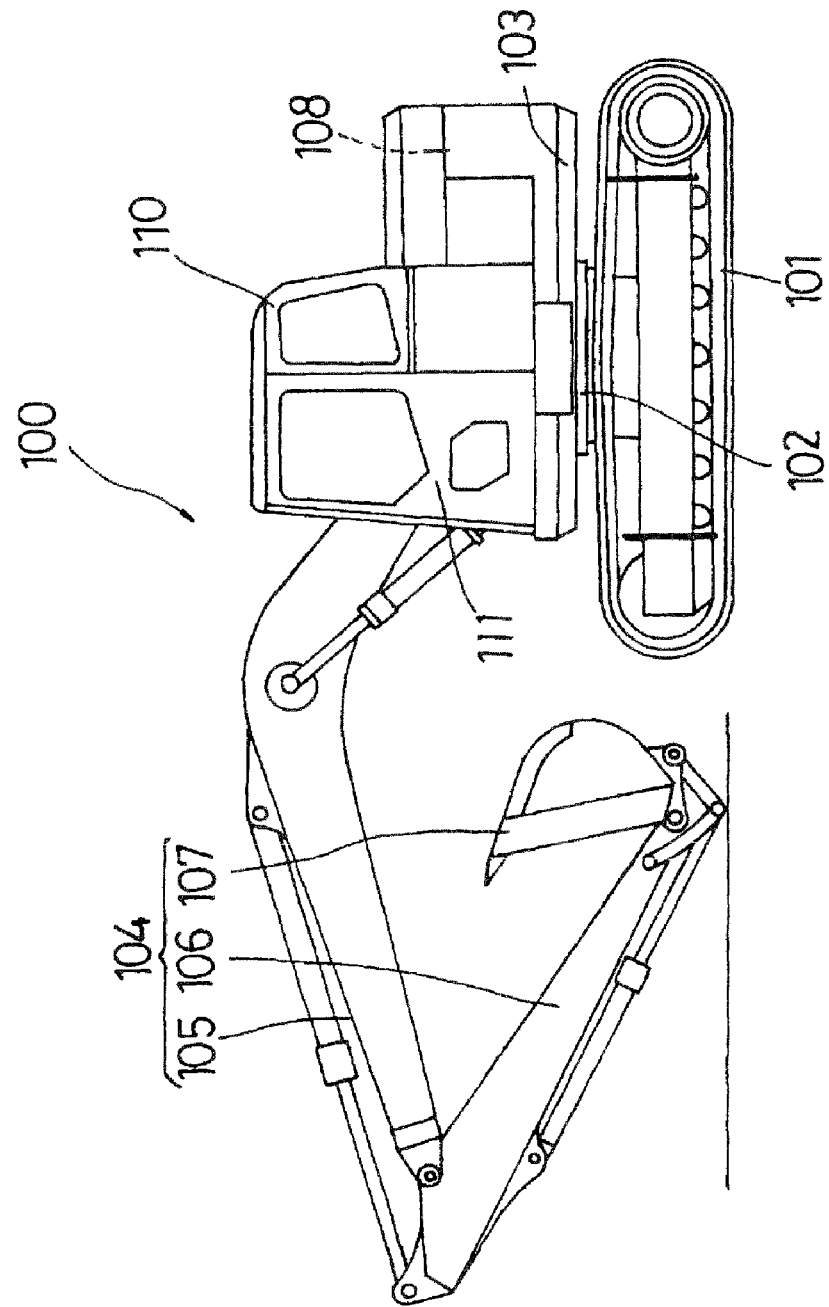
FIG. 14 is a diagram showing an example of a hydraulic shovel, which is a work vehicle.

FIGS. 12(a) to 12(c) are diagrams showing the procedure of the formation of an interior member, and FIGS. 13(a) to 13(c) are diagrams showing the main portions of an example of the assembly of an interior member.

In order to fabricate an interior member as that described above, first, as shown in FIG. 12(a), a polyurethane resin is formed in accordance with a reaction injection molding method (also referred to as an RIM method, which is one of the low pressure molding methods) using a mold 50 (an upper mold 51 and a lower mold 52) which corresponds to the dimensions of foundation body panel 14. At this time, a closing member 17' for duct 17 that is integrally formed with foundation body panel 14 can be simultaneously formed. In this manner, foundation body panel 14 and closing member 17' for the duct can be formed in one molding, which is effective.

Next, a material of an outer layer material 16 that forms the surface of the interior is formed in advance in accordance with a vacuum forming method (thermal forming method) using a separate mold. Then, as shown in FIG. 12(b), a separate mold 54 (an upper mold 55 and a lower mold 56) is utilized, where the material that becomes outer layer material 16, which has been gained in a separate molding, is placed on the surface of lower mold 56. Foundation body panel 14 that has been molded in advance is placed on upper mold 55, and lower mold 56 and upper mold 55 are combined so as to form a gap (cavity 15a) having a thickness that corresponds to that of a sound absorbing material (sound absorbing foaming layer) 15 between the above described outer layer material 16 and foundation body panel 14.

Next, semi-hard polyurethane where continuous foam is to be created or polyurethane having low resilience is injected into cavity 15a that is formed between the above described foundation body panel 14 and outer layer material 16, and thereby, foundation body panel 14 and surface layer material 16 are integrated with sound absorbing foaming layer 15 (see FIG. 12(c)).

In interior member 13 that has been gained in this manner, closing member 17' is made to adhere to and combined with the opening portion of duct 17 that has been simultaneously formed at the time of the formation of the above described foundation body panel 14 using an adhesive, and thereby, duct 17 is formed (see FIG. 13(a)). In addition, opening type clips 18, which become members for attachment, are secured and planted in a number of places on the inner end surfaces of foundation body panel 14 that forms this interior member, in the direction perpendicular to these end surfaces.

Next, the above described clips 18 are engaged with attachment holes that have been provided in advance to an outer plate 11 where longitudinal members 12 for reinforcement and mounting brackets 12a are integrally provided on the inner surface side, and thereby, interior member 13 that has been fabricated in the above described process is attached and integrated. As a result of this, wall member 10 that is described in the above first embodiment can be fabricated (see FIG. 13(b)).

Furthermore, as shown in FIG. 13(c), a small hole is provided from the surface of outer layer material 16 to cavity 19 that has been formed between foundation body panel 14 and outer plate 11 in wall member 10 where outer plate 11 and inner member 13 are integrally connected to each other with clips 18 in the above described process (FIG. 13(b)) so that cavity 19 is connected to the outside, and a sound absorbing foaming material in liquid form is injected using an injection means having a shape that is similar to that of a syringe, such as a chemical syringe (not shown), indicated by arrow P, so as to react and be cured. In this manner, sound absorbing foaming layer 20 is formed within cavity 19, and wall member 10A having the structure that is described in the above second embodiment can be gained. In this configuration, sound absorbing foaming layer 20 can be formed after foundation body panel 14 and outer plate 11 have been connected to each other, and thus, a cavity which exists inside of interior member 13 can be effectively used, even if it is in a complex form, so that interior member 13 having high sound absorbing effects can be fabricated. In addition, adhesion between interior member 13 and outer plate 11 can be enhanced as a result of the reaction of the injected sound absorbing foaming material in liquid form.

In accordance with an interior member and a method for forming the same according to the present invention, a reaction injection molding method and a thermoforming process are adopted in combination for molding the interior member 13, allowing the interior member 13 to have laminated structure. Therefore, unlike the prior art a metal mold is not required and a resin mold can be utilized as a mold for the formation. Accordingly the cost for the mold becomes significantly inexpensive, and as a result, the cost for molding can be reduced, and fabrication of a large sized interior member can be made easy, and thus, products can be gained at a low cost. Therefore, effects are gained, where the task of assembly can be made easy, so that the work process can be shortened and streamlined. In addition, a reduction in the level of noise due to sound blocking/sound absorption, as well as an increase in the comfort within the cab through the reduction of conveyance of the outside temperature through air conditioning can be achieved.

Furthermore, integration of functional parts which are required for the interior, in addition to, of course, the entire configuration thereof, can be made easy at the time of molding, and furthermore, the structural functions of the air conditioning duct, for example, can be enhanced, so that the related apparatuses can be efficiently operated, and thereby, secondary effects can be gained, where an increase in the functions of related apparatuses, in addition to the characteristics of the interior member itself, can be achieved.

What is claimed is:

1. An interior member for a cab of a work vehicle, comprising:
   a foundation body panel which has a first side and a second side, and which comprises a plurality of ribs at the second side, at least one space being defined by the ribs at the second side of the foundation body panel;
   an outer layer material provided at the first side of the foundation body panel;
   a first sound absorbing member comprising a sound absorbing material provided between the outer layer material and the first side of the foundation body panel;
   a second sound absorbing member comprising a sound absorbing material filling at least one said space defined by the ribs at the second side of the foundation body panel;
   a metal plate provided at the second side of the foundation body panel;
   mounting brackets attached to the metal plate to face the second side of the foundation body panel, each of the mounting brackets including an engagement hole; and
   opening type clips that fasten the foundation body panel to the metal plate;
   wherein a first end of each of the opening type clips is placed and installed on a leading end of the respective ribs facing the metal plate and a second end of each of the opening type clips is engaged in the engagement hole of a respective one of the mounting brackets attached to the metal plate so as secure the ribs and the foundation body panel to the metal plate via the mounting brackets.

2. The interior member according to claim 1, wherein at least a plurality of the ribs of the foundation body panel cross each other.

3. The interior member according to claim 1, wherein the sound absorbing material of the second sound absorbing member comprises at least one of: polyurethane foam, glass wool, PET wool and wool made of at least one recycled plastic material.

4. The interior member according to claim 1, wherein the first sound absorbing member has a thickness of 5 mm to 20 mm.

5. An interior member for a cab of a work vehicle, comprising:
   a foundation body panel which has a first side and a second side, and which comprises a plurality of ribs at the second side, at least one space being defined by the ribs at the second side of the foundation body panel;
   an outer layer material provided at the first side of the foundation body panel;
   a sound absorbing member comprising a sound absorbing material provided between the outer layer material and the first side of the foundation body panel;
   a metal plate provided at the second side of the foundation body panel;
   mounting brackets attached to the metal plate to face the second side of the foundation body panel, each of the mounting brackets including an engagement hole; and
   opening type clips that fasten the foundation body panel to the metal plate;
   wherein the foundation body panel comprises a portion for attaching an electrical wire member channel at the second side of the foundation body panel, and
   wherein a first end of each of the opening type clips is placed and installed on a leading end of the respective ribs facing the metal plate and a second end of each of the opening type clips is engaged in the engagement hole of a respective one of the mounting brackets attached to the metal plate so as secure the ribs and the foundation body panel to the metal plate via the mounting brackets.

6. An interior member for a cab of a work vehicle, comprising:
   a foundation body panel which has a first side and a second side, and which comprises a plurality of ribs at the second side, at least one space being defined by the ribs at the second side of the foundation body panel;
   an outer layer material provided at the first side of the foundation body panel;
   a sound absorbing member comprising a sound absorbing material provided between the outer layer material and the first side of the foundation body panel; and
   a metal plate provided at the second side of the foundation body panel;
   mounting brackets attached to the metal plate to face the second side of the foundation body panel, each of the mounting brackets including an engagement hole; and
   opening type clips that fasten the foundation body panel to the metal plate;
   wherein the foundation body panel is made of a material having heat insulating properties, and wherein the foundation body panel comprises a portion for forming an air conditioning duct at the second side of the foundation body panel, and
   wherein a first end of each of the opening type clips is placed and installed on a leading end of the respective ribs facing the metal plate and a second end of each of the opening type clips is engaged in the engagement hole of a respective one of the mounting brackets attached to the metal plate so as secure the ribs and the foundation body panel to the metal plate via the mounting brackets.

7. The interior member according to claim 6, further comprising a closing member which closes a space at least partially defined by the portion for forming the air conditioning duct, wherein the closing member and the portion for forming the air conditioning duct together form the air conditioning duct.

8. A wall member for a cab of a work vehicle, comprising:
(i) an outer metal plate;
(ii) an interior member; and
(iii) opening type clips that mount the interior member to the outer metal plate,
wherein the interior member comprises:
a foundation body panel which has a first side and a second side, and which comprises a plurality of ribs at the second side, at least one space being defined by the ribs at the second side of the foundation body panel, wherein the second side of the foundation body panel is mounted on the outer metal plate such that the outer metal plate closes the at least one space defined by the ribs;
an outer layer material provided at the first side of the foundation body panel;
a first sound absorbing member comprising a sound absorbing material provided between the outer layer material and the first side of the foundation body panel; and
a second sound absorbing member comprising a sound absorbing material filling at least one said space defined by the ribs and closed by the outer metal plate at the second side of the foundation body panel;
wherein the wall member further includes mounting brackets attached to the outer metal plate to face the second side of the foundation body panel, each of the mounting brackets including an engagement hole; and
wherein a first end of each of the opening type clips is placed and installed on a leading end of the respective ribs facing the outer metal plate and a second end of each of the opening type clips is engaged in the engagement hole of a respective one of the mounting brackets attached to the outer metal plate so as secure the ribs and the interior member to the outer metal plate via the mounting brackets.

* * * * *